Aug. 12, 1924.

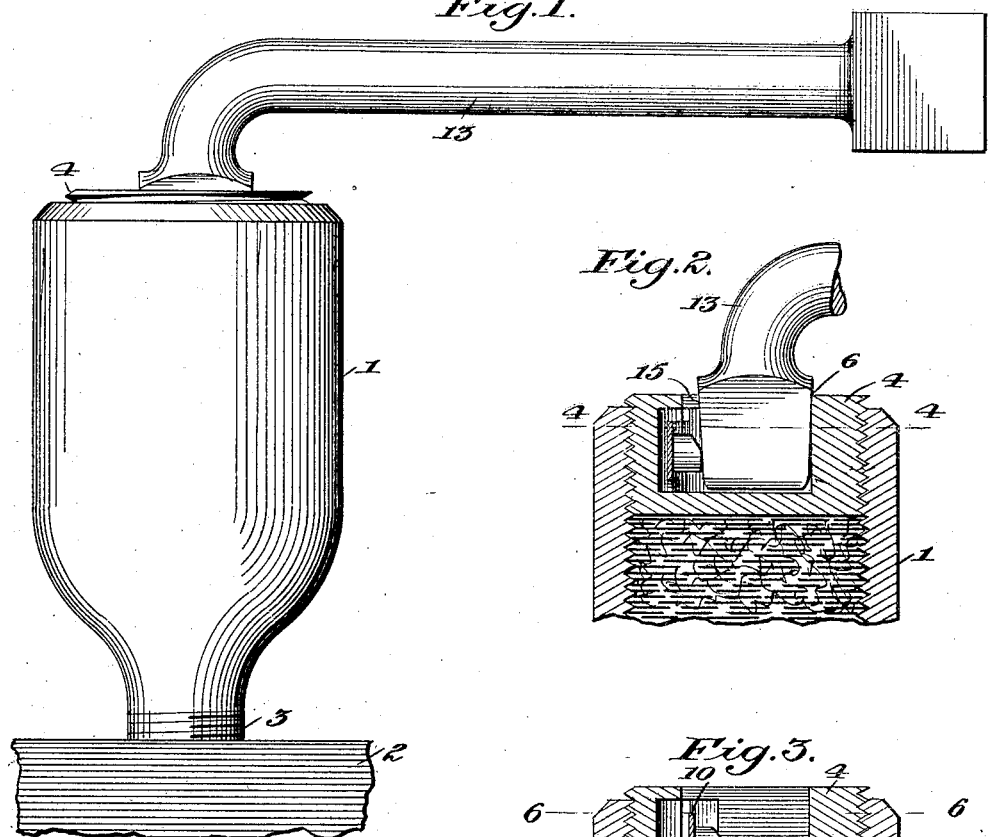

F. T. ROWLAND ET AL 1,504,512

LOCK FOR GREASE CUP PLUGS

Filed Oct. 1, 1923

Inventors:
Fred T. Rowland
William H. Le Gresley
by C. A. Mason, Att'y.

Patented Aug. 12, 1924.

1,504,512

UNITED STATES PATENT OFFICE.

FRED T. ROWLAND AND WILLIAM H. LE GRESLEY, OF EMPORIA, KANSAS.

LOCK FOR GREASE-CUP PLUGS.

Application filed October 1, 1923. Serial No. 665,920.

*To all whom it may concern:*

Be it known that we, FRED T. ROWLAND and WILLIAM H. LE GRESLEY, citizens of the United States of America, residing at Emporia, in the county of Lyon and State of Kansas, have invented certain new and useful Improvements in Locks for Grease-Cup Plugs, of which the following is a full, clear, and exact description.

This invention relates to grease and oil cups for use in lubricating machinery, as gasoline engines, locomotives, stationary engines, farm implements, etc. More particularly, the invention relates to a novel means for locking the plugs of grease cups for lubricating purposes generally.

Grease cups of the type to which this invention relates are provided with a body portion to contain the grease or other lubricant, and a plug which has threaded engagement with the grease cup body and is adapted to be screwed down to expel the grease from the discharge end of the cup to the bearing, or other points of lubrication. These grease cups are frequently carried upon the movable parts of machinery, such as on locomotive side rods, for example, where they are subject to vibration which has a tendency to cause the plug to be unscrewed and lost. The present invention is concerned with an approved locking device which is automatic in its action, and serves to lock the plug to the body portion of the cup in any position to which the plug may be screwed in expelling the grease, such locking device acting automatically to lock the plug in position when the wrench which is employed for turning down the plug is removed.

The invention will be best understood from the following detailed description, in connection with the accompanying drawings, and the novel features thereof will be pointed out in the appended claims.

In the drawings:

Fig. 1 is a view in side elevation, illustrating the grease cup and its wrench in position for removing the plug;

Fig. 2 is a vertical sectional view through the plug, cup, and locking spring with the wrench in the plug socket;

Fig. 3 is a similar view, showing the wrench removed and the locking spring in locking position;

Figure 4:
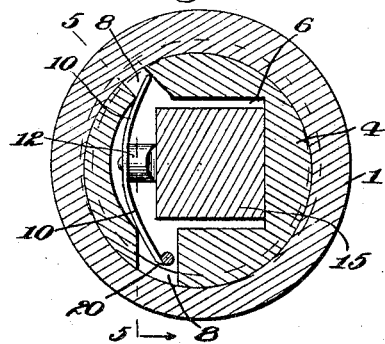
Fig. 4 is a horizontal section on the line 4—4, Fig. 2.

The body portion 1 of the grease cup may be of any suitable shape adapted to contain grease or other lubricant, and is herein shown as having a lower contracted end 3 which is externally threaded to engage with a thread in the portion 2 of the machine which may contain the bearing to which the grease is fed.

The body 1 is herein shown as provided with an internal screw thread 16 which is engaged by an externally threaded grease cup plug 4. The plug 4 is screwed down upon the grease in the cup to force said grease to the bearing, or other point to be lubricated, in the usual manner. As herein shown, the plug 4 is provided with a rectangular socket 6 within which may be fitted the end 15 of a wrench 13, the wrench end in this case being shown as squared with its sides slightly tapering towards the ends.

The socket 6 in the plug is provided with two openings 8, 8, which lead outwardly from the interior thereof, and a locking spring 10 is located in a space between socket 6 and one of the plug walls, the recess in which said spring is located being in communication with the openings 8, 8. The spring 10 is so located in the plug that its ends project into the openings 8, 8, and one of the ends of the spring is provided with a sharp edge 20, which is adapted to engage and bite into the internal thread of the grease cup body, when said spring straightens out for locking the plug to the cup.

Figure 6:
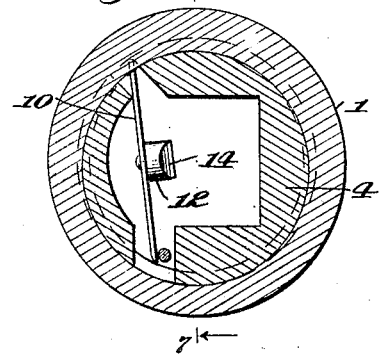
Fig. 6 is a horizontal sectional view on the line 6—6, Fig. 3.
Figure 5:
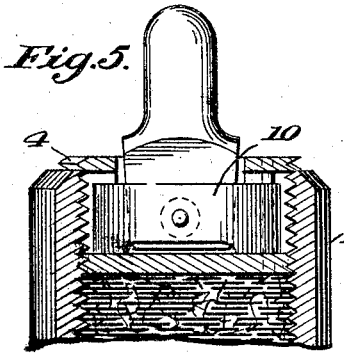
Fig. 5 is a sectional view on the line 5—5, Fig. 4.
Figure 7:
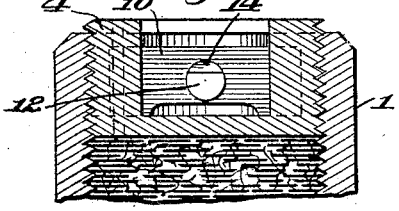
Fig. 7 is a section on the line 7—7, Fig. 6.
Figure 8:
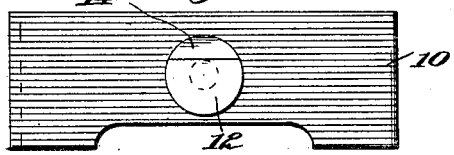
Figs. 8 and 9 are detail views of the locking spring and lug.
Figure 9:
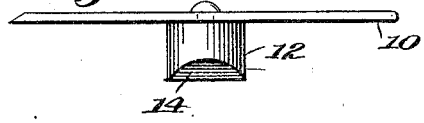

The spring 10 is provided at its central portion with a projecting lug 12, having its upper edge beveled at 14. When the wrench end 15 is inserted in the socket 6 of the plug, one of the beveled surfaces of the wrench engages the bevel 14 and bends the lock spring at its center as shown in Fig. 4, thus unlocking the plug from the cup and permitting the former of these parts to be rotated for expelling the grease from the cup, or for removal of the plug from the cup by reverse rotation of the plug. When the wrench is removed from the socket in the plug the tension on the locking spring is released, and the spring straightens out as shown in Fig. 6, thus bringing the sharpened end 20 of the spring into locking engagement with the internal thread of the body 1 of the cup. This latter position of the locking spring is shown in Fig. 6.

It will be observed that the locking of the plug to the cup is automatic and instantaneous, and takes place without requiring any thought on the part of the operator, and by the mere act of the removal of the wrench from the plug socket, the plug being locked to the cup at any point to which it has been turned by the wrench as the end of the spring 10 bites into the thread of the cup, and effectually secures the plug against accidental or intentional removal, by jarring loose, or otherwise.

On the other hand, it is equally true that the plug is unlocked from the cup and its free turning permitted by the wrench, due to the mere act of inserting the end of the wrench in the plug socket, as such insertion causes engagement between the lug 12 and wrench end, and, through the beveled surface 14 on the lug the spring is instantly bent into the position shown in Fig. 4, which withdraws the end of the spring from locking engagement with the internal thread of the grease cup.

The dowel pin 20 which extends into one of the openings 8 in the plug prevents the spring 10 from coming out of the plug when the plug is removed from the cup.

Changes may be made in the relative arrangement of the parts shown, or in the details of the construction thereof, without departing from the principle of the invention, provided such changes or variations fall within the scope of the following claims.

Having thus described our invention, what we claim as new and desire to secure by Letters Patent of the United States is:

1. A grease cup having, in combination, a body portion having an internal thread, an externally threaded plug movable therein, and a locking spring carried by said plug and arranged so that its end may engage the internal thread of said body portion to lock the plug thereto, said spring being constructed and arranged for operation by the tool which turns the plug, for locking and unlocking said plug.

2. A grease cup having, in combination, an internally threaded body portion, a plug in threaded engagement with the interior thereof, a spring in said plug with an end adapted for engagement with the thread of the body portion to lock the plug in position, and means for operating said spring to lock and unlock the plug.

3. A grease cup having, in combination, an internally threaded body portion, a plug in threaded engagement with the interior thereof, said plug having a wrench socket, a locking spring arranged for movement in said plug to cause its end to engage or disengage the thread of said body portion, and means whereby said spring may be operated by the insertion and withdrawal of a wrench for rotating the plug, to effect a locking and unlocking engagement between said spring and said grease cup.

4. A grease cup provided with an internal thread, a plug externally threaded to engage the thread of the grease cup, said plug having a wrench-receiving socket, a locking spring located in said plug, a lug carried by said spring and arranged to be engaged by the wrench which rotates said plug for bending said spring, said spring constructed and arranged to engage said internal thread and lock the plug to the cup when the wrench is withdrawn and to disengage said thread and unlock said parts when the wrench is inserted.

5. An internally threaded grease cup having, in combination, a plug in threaded engagement with the cup and arranged to expel the grease therefrom, said plug having a rectangular socket to receive a wrench and a recess communicating with said socket and having openings leading through said plug, a flat spring in said recess having its ends extending into said openings, one of said ends being arranged to bite into the internal thread of the cup when the spring is expanded to normal condition, the end of said spring being adapted to be withdrawn from locking engagement with said thread when a wrench is inserted in said socket for rotating said plug.

In testimony whereof we have hereunto set our hands this 18th day of September, A. D. 1923.

FRED T. ROWLAND.
WILLIAM H. LE GRESLEY.